(12) United States Patent
Maeda

(10) Patent No.: US 6,324,155 B1
(45) Date of Patent: *Nov. 27, 2001

(54) OPTICAL INFORMATION RECORDING MEDIUM WITH FLAT REFLECTING FILM AND READING SYSTEM FOR READING INFORMATION RECORDED THEREON

(75) Inventor: Takanori Maeda, Saitama-ken (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,926

(22) Filed: Aug. 8, 1997

(30) Foreign Application Priority Data

Aug. 9, 1996 (JP) .................................................. 8-211784

(51) Int. Cl.$^7$ ....................................................... G11B 7/00
(52) U.S. Cl. ...................................... 369/275.1; 369/275.5
(58) Field of Search .................................... 369/112, 119, 369/118, 44.23, 44.24, 44.37, 94, 58, 54, 275.3

(56) References Cited

U.S. PATENT DOCUMENTS

| | | | |
|---|---|---|---|
| 4,481,620 | * 11/1984 | Murakami | 369/275.5 |
| 4,793,696 | * 12/1988 | Suh | 369/44.23 |
| 4,860,274 | * 8/1989 | Kobayashi | 369/275.2 |
| 5,197,060 | * 3/1993 | Yatake | 369/275.3 |
| 5,247,503 | * 9/1993 | Nomiyama et al. | 369/44.23 |
| 5,251,198 | * 10/1993 | Strickler | 369/94 |
| 5,251,202 | * 10/1993 | Kaneko et al. | 369/275.5 |
| 5,253,233 | * 10/1993 | Fujii | 369/275.3 |
| 5,346,740 | * 9/1994 | Ohno et al. | 369/275.2 |
| 5,348,783 | * 9/1994 | Ohno et al. | 369/275.3 |
| 5,408,453 | * 4/1995 | Holtslag et al. | 369/44.23 |
| 5,483,511 | * 1/1996 | Jewell et al. | 369/44.37 |
| 5,515,346 | * 5/1996 | Watanabe et al. | 369/44.23 |
| 5,518,788 | * 5/1996 | Invie | 369/275.4 |
| 5,521,901 | * 5/1996 | Okada et al. | 369/275.3 |
| 5,559,784 | * 9/1996 | Ota | 369/275.4 |
| 5,577,021 | * 11/1996 | Nakatani et al. | 369/275.2 |
| 5,606,542 | * 2/1997 | Kim | 369/119 |
| 5,615,186 | * 3/1997 | Rosen et al. | 369/44.24 |
| 5,619,371 | * 4/1997 | Pontius | 369/94 |
| 5,625,609 | * 4/1997 | Latta et al. | 369/44.23 |
| 5,671,207 | * 9/1997 | Park | 369/112 |
| 5,708,653 | * 1/1998 | Okada et al. | 369/94 |
| 5,726,970 | * 3/1998 | Kaneko et al. | 369/94 |
| 5,745,465 | * 4/1998 | Tsai et al. | 369/110 |
| 5,751,682 | * 5/1998 | Hasegawa | 369/44.23 |

(List continued on next page.)

FOREIGN PATENT DOCUMENTS

WO 95/31807 * 11/1995 (WO) ..................................... 369/94

OTHER PUBLICATIONS

S.R. Chinn and E. A. Swanson, Multilayer Optical Storage By Low–Coherence Reflectometry, Jun. 15, 1996, vol. 21, No. 12/Optics Letters, pp. 899–901.

Robert C. Youngquist, Sally Carr, and D. E. N. Davies, Optical Coherence–Domain Reflectometry: A New Optical Evaluation Technique, Mar. 1987, vol. 12, No. 3/Optics Letters, pp. 158–160.

*Primary Examiner*—Nabil Hindi
(74) *Attorney, Agent, or Firm*—Morgan, Lewis & Bockius LLP

(57) ABSTRACT

A recording layer formed between a first substrate and a second substrate. The recording layer has recording surfaces on both sides thereof. A reflecting film is formed on an outside surface of the first substrate. The first and second substrates adjacent the recording layer have different refractive indexes from each other.

30 Claims, 9 Drawing Sheets

U.S. PATENT DOCUMENTS

| | | | |
|---|---|---|---|
| 5,761,187 | * | 8/1998 | Kaneko et al. .................... 369/94 |
| 5,784,352 | * | 7/1998 | Swanson et al. .................. 369/94 |
| 5,784,354 | * | 7/1998 | Lee ................................. 369/44.37 |
| 5,828,648 | * | 10/1998 | Takasu et al. .................... 369/94 |
| 5,864,530 | * | 1/1999 | Holtslg et al. ................... 369/94 |
| 5,881,042 | * | 3/1999 | Knight ............................. 369/94 |
| 5,936,928 | * | 8/1999 | Jain et al. ........................ 369/94 |
| 6,005,838 | * | 12/1999 | Fan et al. ........................ 369/94 |
| 6,009,065 | * | 12/1999 | Glushko et al. ................. 369/94 |
| 6,140,011 | * | 10/2000 | Ohkubo et al. ................ 369/275.4 |

* cited by examiner

SLD

OPTICAL INFORMATION RECORDING MEDIUM WITH FLAT REFLECTING FILM AND READING SYSTEM FOR READING INFORMATION RECORDED THEREON

BACKGROUND OF THE INVENTION

The present invention relates to an optical information recording medium in which information such as a video signal, an audio signal and a software of a computer is recorded and a reading system for reading the information recorded on the optical information recording medium.

Recently, a software or contents of a computer are recorded on a compact disc as an optical information recording medium, and the compact disc is distributed to a user. In the compact disc, the information is recorded on a recording surface thereof in the form of grooves and lands. The grooves and lands are coated with a reflecting film made of aluminum by vacuum deposition. Thus, a reflecting surface is provided on the recording surface having the pits. In order to read the recorded information of the disc, a reading system emits a light beam which is projected on the pit of the recording surface and the light reflected from the reflecting surface of the recording surface is detected. Thus, the information is read out.

Since the quantity of information to be distributed at one time has been increased, it is desirable to increase the recording capacity of the disc. Therefore, it is considered to form the pits on the disc more finely. On the other hand, it is considered the reading system is employed with a light source having a short wavelength, or an objective having a large numerical aperture, thereby improving a resolving power of a pickup.

However, there is a limit to increase the recording capacity of the disc. Furthermore, there is a problem that if the recording capacity is increased, it takes a longer time than a conventional disc to access the necessary information.

In order to eliminate such inconvenience, an optical disc having two recording surfaces is known.

FIG. 10 shows an optical disc having two recording surfaces. An optical disc 1 comprises a substrate 2 made of polycarbonate, a recording layer 4 provided on the substrate 2, and a protection layer 3 made of acrylic resin and provided on the recording layer 4 for protecting the recording layer.

The recording layer 4 is made of ultraviolet curing transparent resin and has a first recording surface 7 formed on an upper portion thereof (as viewed in FIG. 10) and a second recording surface 8 formed on a lower portion thereof (as viewed in FIG. 10). On the first and second recording surfaces 7 and 8, information is recorded in the form of grooves and lands. A half mirror film 5 is coated on the first recording surface 7. The half mirror film 5 is made of gold so as to reflect 40% of light beams applied to the first recording surface 7 from a reading system (not shown). A reflecting film 6 is coated on the second recording surface 8. The reflecting film 6 is made of aluminum so as to reflect all of the light beams applied to the second recording surface 8.

In order to read information recorded on the first recording surface 7 of the disc 1, a light beam emitted from the reading system is focused on the pit of the first recording surface 7 and reflected beams of 40% are read out. On the other hand, in order to read information recorded on the second recording surface 8, the light beam emitted from the reading system is focused on the pit of the second recording surface 8 and reflected beams of 36% (=60%×60%) are read out.

Namely, in such a structure, if a focal point is properly adjusted on the pit of either of the recording surfaces 7 and 8, the information on the selected recording surface can be read out. Consequently, the recording capacity of the optical disc can be increased twice that of the disc having the single recording surface.

However, since the half mirror film 5 is provided in the disc 1, it affects the quantity of light to be reduced so that the signal-to-noise ratio is deteriorated. Furthermore, the light beams which do not contribute the reading information are detected by the reading system as stray light which affects a servo signal. If the number of recording surfaces is increased, for example, more than three, the quantity of light is further reduced to increase the stray light. Therefore, only two recording surfaces are provided.

In order to solve the aforementioned problems, there has been proposed a reading system employed with a principle of Optical Coherence Domain Reflectometry (OCDR) reported on page 899 of No. 12 of "Optics letters Vol. 21".

FIG. 11 shows a reading system employed with the principle of OCDR. A reading system 10 is provided for reading information recorded on a multi-layered optical disc 9. The reading system 10 comprises a light source 11, a lens 17, a beam splitter 12, a lens 18, an optical phase shifter 13, a reflecting mirror 14, an objective 16 and a photodetector 15.

As the light source 11, a super luminescent diode (SLD) having a temporal incoherent characteristic is employed. At the the beam splitter 12, a light beam emitted from the light source 11 is divided into reference light and detecting light for interfering with each other. The information recorded on the disc 9 is read out in accordance with the interference. The reflecting mirror 14 is provided to be served as a reference surface and moved in the directions shown by arrows.

In the light source 11 having a temporal incoherent characteristic, interference between light waves generates. However, the interference generates only when an optical path difference is approximately zero. To this end, the mirror 14 is moved in order that the distance between the beam splitter 12 and the mirror 14 and the distance between the beam splitter 12 and one of the recording surface of the disc 9 becomes equal to each other.

Referring to FIG. 12, the optical disc 9 comprises an upper substrate 2A made of polycarbonate, a recording layer 4A provided on the upper substrate 2A, and a lower substrate 3A made of acrylic resin and provided on the recording layer 4A for protecting the recording layer. The recording layer 4A is made of ultraviolet curing transparent resin and has upper and lower recording surfaces 19 and 20. Information is recorded on the respective recording surfaces 19 and 20 in the form of grooves and lands.

Furthermore, the upper substrate 2A and the recording layer 4A are different in refractive index, so that a part of quantity of the incident light reflects from the upper recording surface 19. In addition, the depth of the groove is determined such that a phase difference between the phase of the incident light and the phase of the reflected light becomes π, so that the reflected light interferes with the incident light, thereby largely reducing the reflected light from the groove.

At the beam splitter 12, the reference light is applied to the reference mirror 14 through the optical phase shifter 13. The reference light reflected back to the beam splitter 12 is applied to the photodetector 15. On the other hand, the detecting light is applied to one of the recording surface of the disc 9 and reflected back to the beam splitter 12 and applied to the photodetector 15 through the objective 16. Thus, the reference light and the detecting light are interfered with each other, thereby enabling the reading of the information on the selected recording surface of the disc.

Since a part of the incident light is reflected from the upper recording surface 19, it is not necessary to provide the half mirror film 5 formed in the disc 1 of FIG. 10. Therefore, the disc having a multi-layered recording surfaces can be easily obtained. Thus, it is possible to increase the recording capacity of the disc. In the reading system, the quantity of light is prevented from reducing, and the information can be read out with accuracy at a high speed.

However, in such a disc and a reading system, it is necessary to make the distance between the beam splitter 12 and the mirror 14 and the distance between the beam splitter 12 and the recording surface of the disc 9 to be equal in order to cause both light waves to interfere with each other. Therefore, the lateral vibration and change of the position of the disc during the rotation of the disc 9 which are caused by the deformation of the disc must be accurately controlled. Accordingly, process and cost for manufacturing the disc 9 and the reading system 10 are increased.

SUMMARY OF THE INVENTION

An object of the present invention is to provide an optical information recording medium having multi-layered recording surfaces, the information can be accurately read out.

Another object of the present invention is to provide a reading system which may read information recorded on the multi-layered disc with a good signal-to-noise ratio without high accurate control during the reading operation.

According to the present invention, there is provided an optical recording medium comprising a first substrate, a recording layer formed on the first substrate having at least one recording surface on a side thereof, a second substrate formed on the recording layer, a reflecting film formed on an outside surface of the first substrate.

The first and second substrates adjacent the recording layer have different refractive indexes from each other.

The recording surface comprises grooves and lands for recording information, and the depth of the groove is set so that the phase difference between the phase of an incident light entered the second substrate and the phase of the light reflected from the recording surface becomes π.

The present invention further provides a system for reading information recorded on an optical recording medium having a first substrate, a recording layer formed on the first substrate having at least one recording surface on a side thereof, a second substrate formed on the recording layer, and a reflecting film formed on an outside surface of the first substrate, comprising a light source, dividing means for dividing a luminous flux into two luminous fluxes, focusing means for selectively focusing the two luminous fluxes on one of the recording surfaces, a photodetector for receiving the two luminous fluxes reflected from the optical recording medium, optical path length setting means for setting the optical path length difference between the two luminous fluxes from the light source to the focusing means in accordance with the optical distance between the reflecting film and the recording surface.

The optical path length setting means is provided to set the optical path length difference between two luminous fluxes from the light source to the focusing means to two times the optical path length between the reflecting film and the recording surface.

The optical path length setting means includes a movable mirror provided in one of the luminous fluxes, the optical path length difference is adjusted by moving the movable mirror.

The optical path length setting means may be a refractive index variable member the refractive index of which is variable is provided in at least one luminous flux, so that the optical path length of the luminous flux is adjusted.

These and other objects and features of the present invention will become more apparent from the following detailed description with reference to the accompanying drawings.

DETAILED DESCRIPTION OF THE PREFERRED EMBODIMENTS

Figure 1:
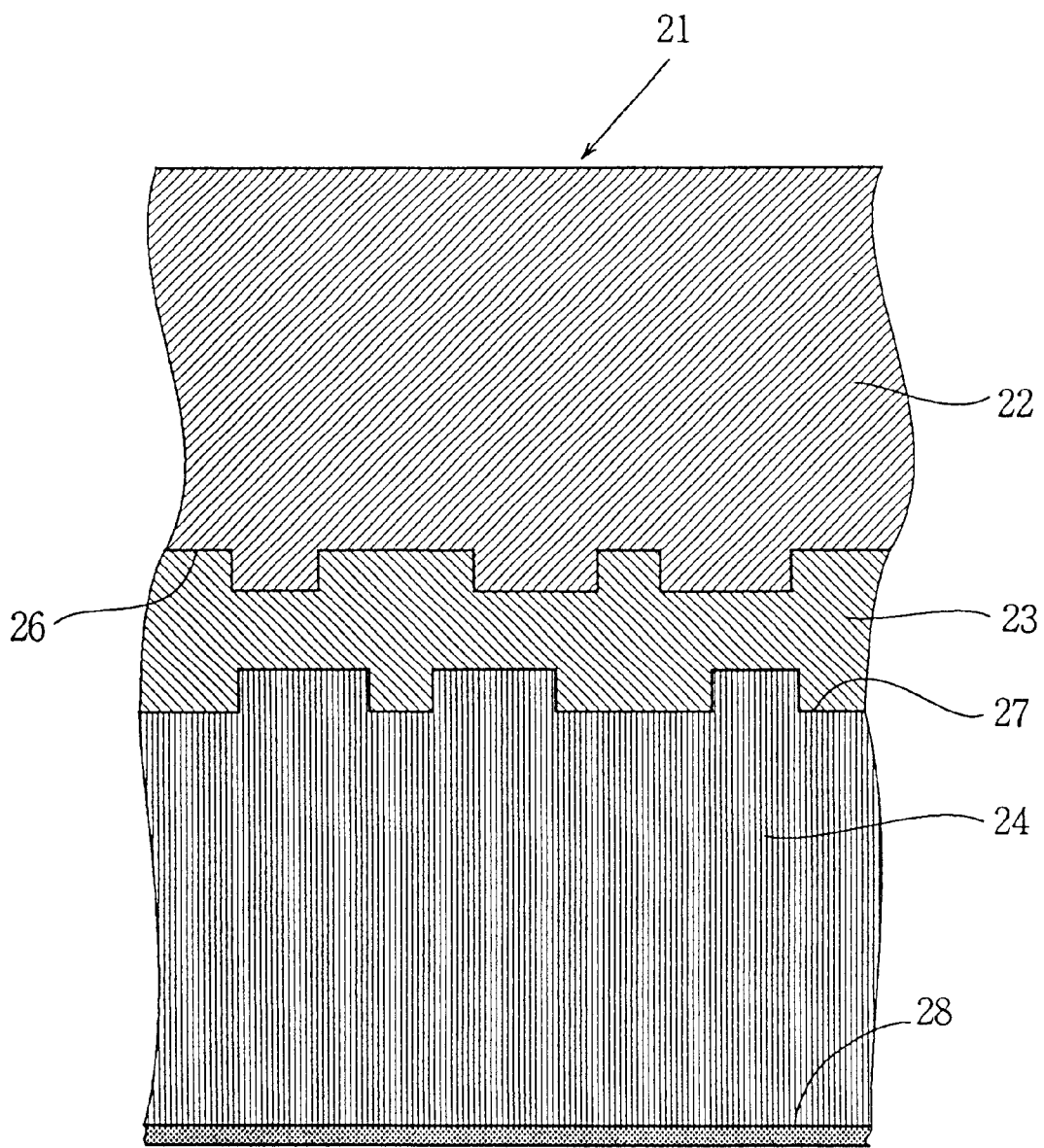
FIG. 1 is a schematic sectional view showing an optical disc of the present invention.

Referring to FIG. 1 showing an optical disc of the present invention, an optical disc 21 comprises a first substrate 24, a second substrate 22, and a recording layer 23 charged in the space between the first and second substrates 24 and 22. A reflecting film 28 made of aluminum is coated on the outside surface of the first substrate 24. The first and second substrate 24 and 22 are made of polycarbonate. The recording layer 23 made of ultraviolet curing resin has upper and lower recording surfaces 26 and 27 in the form of grooves and lands (hereinafter called pits). Furthermore, refractive indexes of the adjacent substrate 22 and the recording layer 23 are different from each other and refractive indexes of the adjacent layer 23 and the substrate 24 are different from each other.

Therefore, a part of the incident light is reflected from the recording surface 26 and the recording surface 27. Furthermore, the depth of the groove is set so that the phase difference between the phase of the incident light and the phase of the reflected light from the recording surface 26 or 27 becomes π.

In place of ultraviolet curing resin, the recording layer 23 is made by air or inert gas charged in the space between the substrates 22 and 24.

Figure 2:
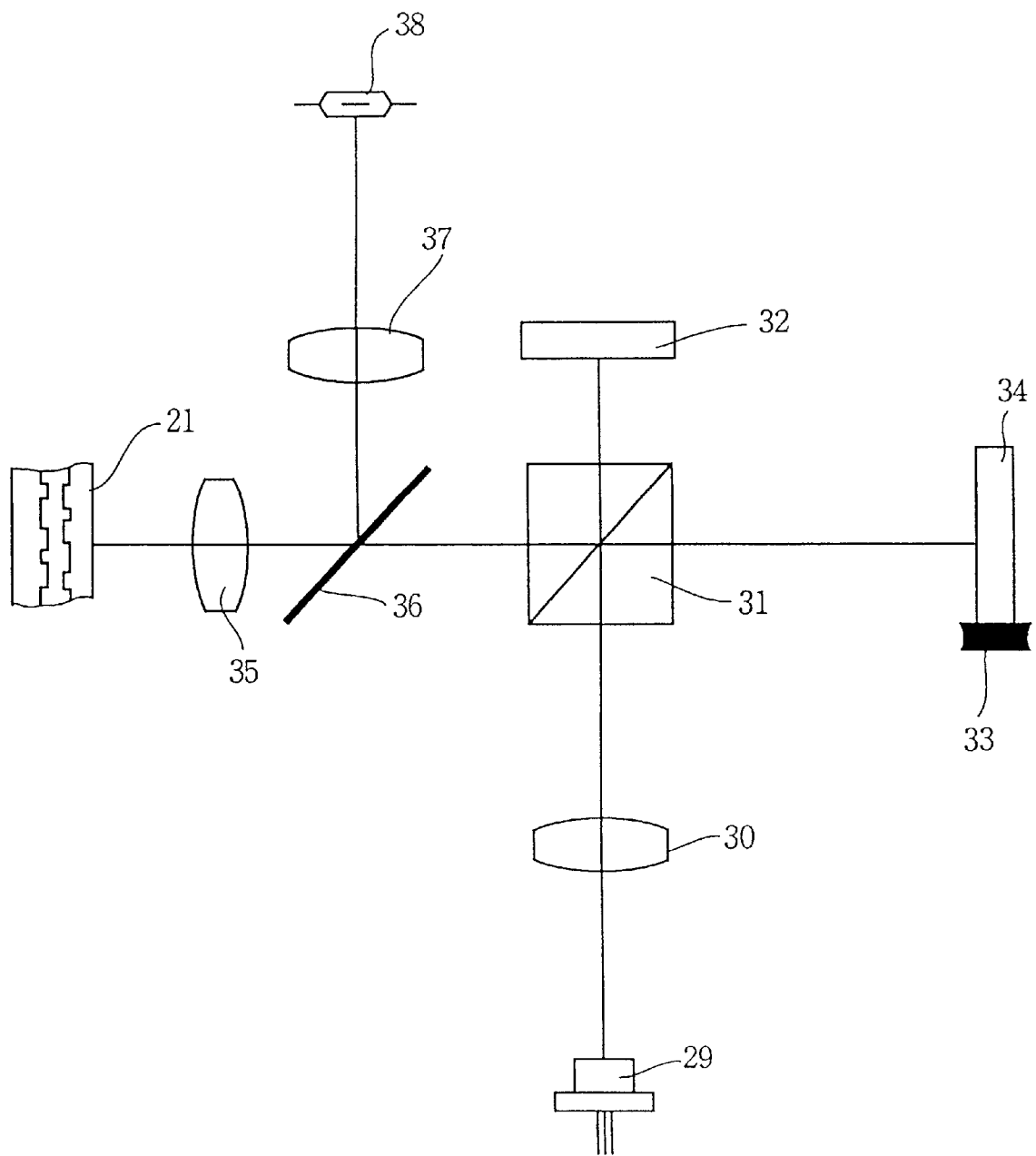
FIG. 2 is a diagram showing a reading system of the the present invention.

FIG. 2 shows a reading system (pickup) of the present invention for reading information recorded on the recording surfaces 26 and 27 of the optical disc 21. The reading system comprises a light source 29, a collimator lens 30, a beam splitter 31 for dividing a light beam into two luminous fluxes, a fixed mirror 32, a reference mirror 34 mounted on a moving device 33, a half mirror 36, an objective 35, an imagery lens 37 and a photodetector 38. The elements 31, 32 and 34 composes a light projecting means.

As a light source 29, the SLD having a temporal incoherent characteristic is employed. Light beams emitted from the SLD 29 are paralleled at the collimator lens 30. At the beam splitter 31, the parallel light beam is divided into two luminous fluxes, namely, detecting light and reference light. The detecting light is reflected from the fixed mirror 32, and the reference light is reflected from the reference mirror 34. The reflected light beams are fed back to the beam splitter 31 and recombined at the beam splitter 31. The moving device 33 is a piezoelectric transducer (actuator) for slightly moving the reference mirror 34 in right and left directions (as viewed in FIG. 2). The half mirror 36 reflects the light beam reflected from disc 21 to the photodetector 38.

Figure 3:
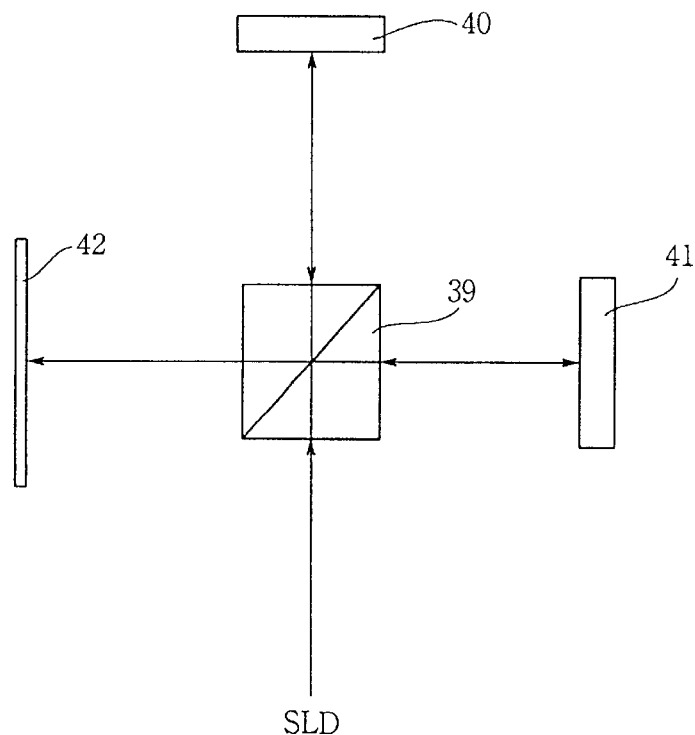
FIG. 3 is a diagram showing the principle for operation of the reading system.

First, a basic operation of the reading system will be describe with reference to FIG. 3. FIG. 3 shows an example of the Michelson interferometer. When a light beam emitted from the above mentioned SLD is applied to a beam splitter 39, the light beam is divided into two luminous fluxes, namely, transmitting light and reflecting light. The transmitting light is reflected from a mirror 40 and the reflecting light is reflected from a mirror 41. Both of the reflected light beams are recombined at the beam splitter 39 and projected on a screen 42.

Figure 4:
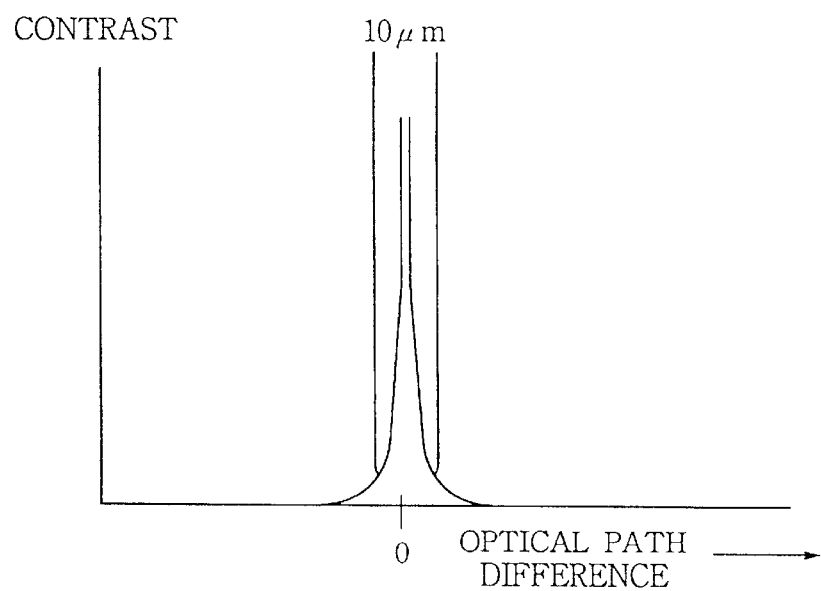
FIG. 4 is a diagram showing a relationship between the optical path difference and the contrast.

It is assumed that the distance between the beam splitter 39 and the mirror 40 is an optical path length $\underline{a}$, and the distance between the beam splitter 39 and the mirror 41 is an optical path length b. FIG. 4 shows a relationship between an optical path difference $\underline{a}$–b in abscissa and a contrast of interference fringes projected on the screen 42 in ordinate. From the foregoing, it will be seen that when the optical path difference is within 10 $\mu$m, the contrast is produced. Thus, the information included in the contrast can be read out. The specification of Japanese Patent No. 1560442 discloses such a relationship in detail.

The reading system of the present invention is composed based on the aforementioned principle. Namely, the optical path lengths of two luminous fluxes from the light source 29 to the photodetector 38 are set to be equal to each other for producing the contrast. Namely, the difference between optical path lengths is set within 10 $\mu$m. Thus, the information included in the contrast (pits on the recording surfaces 26 and 27) can be precisely read out.

When one of the recording surfaces 26 and 27 is selected, the moving device 33 is moved according to the distance between the recording surfaces 26 and 27. However, the distance must be within 10 $\mu$m. In other words, the optical path difference between the optical path length of the detecting light between the beam splitter 31 and the fixed mirror 32, and the optical path length of the reference light between the beam splitter 31 and the reference mirror 34 can be changed by the moving device 33 in the range of the length between the optical path length between the reflecting film 28 and the recording surface 26 and the optical path length between the reflecting film 28 and the recording surface 27.

The difference between the optical path length from the beam splitter 31 to the fixed mirror 32 and the optical path length from the beam splitter 31 to the reference mirror 34 is set so that the two optical path lengths from the light source 29 to the photodetector 38 becomes equal (within 10 $\mu$m) so as to cause the interference of two light beams. Therefore, the reference mirror 34 is located at a position to cause the interference.

More particularly, a part of the detecting light from the mirror 32 and a part of the reference light from the mirror 34 are reflected from the reflecting film 28, respectively. In such a condition, the optical path length of the detecting light from the mirror 32 and reflected from the reflecting film 28 is longer than the optical path length of the light reflected form the recording surface 26 (27) by a distance (d) between the reflecting film 28 and the recording surface 26. Therefore, in order to equalize two optical total path lengths, for example, the moving device 33 is moved to a position where the difference between the optical path length from the beam splitter 31 to the reference mirror 34 and the optical path length from the beam splitter 31 to the fixed mirror 32 becomes approximately two times (2d) the optical path length (d) between the reflecting film 28 and the recording surface 26.

The operation of the reading system will be described.

The reference light reflected from the reference mirror 34 mounted on the moving device 33 is back to the beam splitter 31 and recombined with the detecting light at the beam splitter. The recombined light beams are applied to the objective 35 passing through the half mirror 36 and focused on the the recording surface 26 of the disc 21. The objective 35 is controlled by a focus servo circuit to focus the light on the recording surface 26.

Figure 10:
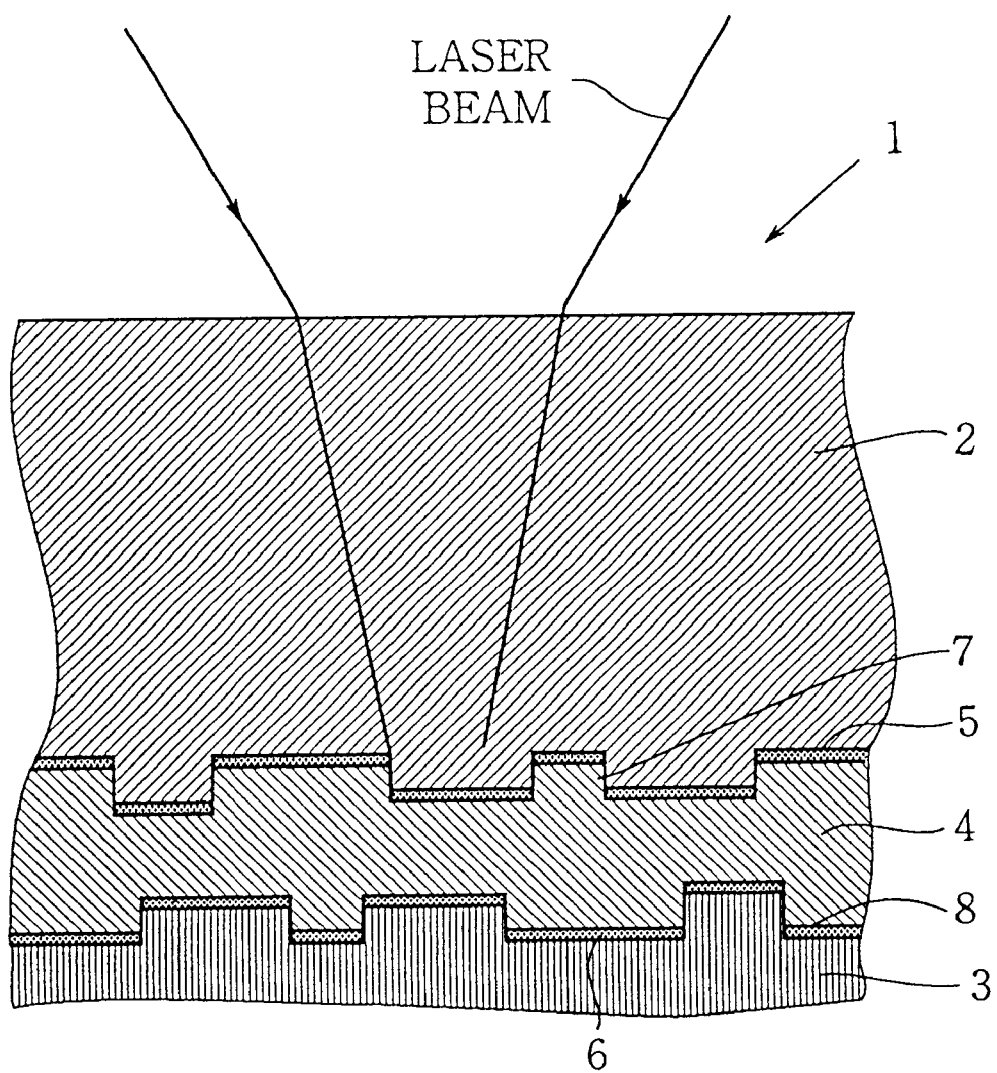
FIG. 10 is a schematic sectional view showing a conventional optical disc.
Figure 11:
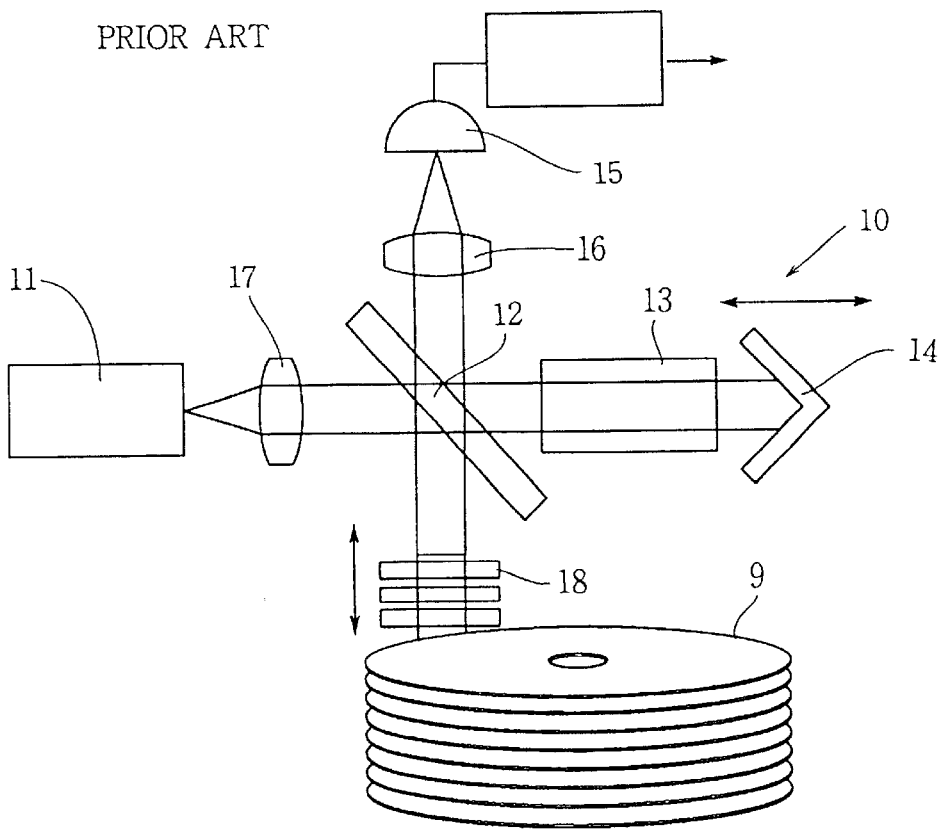
FIG. 11 is a diagram showing a conventional reading system.
Figure 12:
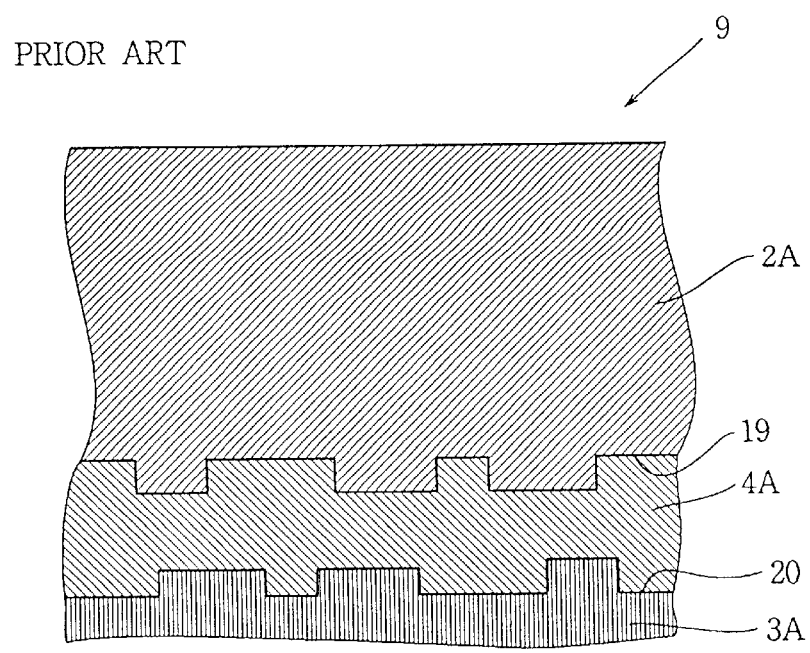
FIG. 12 is a schematic sectional view showing another conventional optical disc.

Since the refractive index of the second substrate 22 is different from that of the recording layer 23, a certain quantity of light of the incident light is reflected from the recording surface 26. Therefore, the half mirror 5 provided in the conventional disc of FIG. 10 is omitted. The transmitted light further transmits the recording surface 27. Since the transmitted light is not focused on the recording surface, the light is not influenced by the pits on the recording surface 27. Then, the light is reflected from the reflecting film 28 and condensed at the objective 35. The light reflected from the half mirror 36 is applied to the photodetector 38 passing through the imagery lens 37. Thus, an image of pit is focused on the photodetector 38.

The moving device 33 is set such that the optical path length of the detecting light reflected from the fixed mirror 32 and reflected from the reflecting film 28 is equal to the optical path length of the reference light reflected from the reference mirror 34 and reflected from the recording surface 26 (the optical path difference thereof is within 10 $\mu$m). Thus, both light beams interfere with each other, so that the light of high contrast including the information of pits of the recording surface 26 is produced at the photodetector 38.

In the operation, the light from the reference mirror 34 and reflected from the reflecting film 28 and the light from the fixed mirror 32 and reflected from the recording surface 26 do not contribute to the interference since the total optical path length of each light is different from the length of two optical paths.

From the foregoing, in the embodiment, the reflecting film such as a half mirror is not provided on the recording surface 26 of the disc 21, and an image of pit having a high contrast can be obtained in accordance with the reference light and the detecting light divided at the beam splitter 31. Therefore, the reduction of the quantity of light caused by the reflecting film is prevented.

The light beams which do not contribute the image formation are added to output signal of the photodetector as a certain quantity because of the low temporal coherent of SLD of the light source 29. Since a sufficient contrast for separating a necessary signal from output signal is obtained in accordance with the OCDR, no problem arises. Therefore, the light including the information of the pits of the recording surface does not affect the reading operation for reading information of the recording surface 26.

During the reading operation, if the distance between the reading system and the disc 21 changes caused by disc warp, the optical path difference between reference and detecting light beams does not change. Thus, the information is stably read out.

In the reading system, the moving device is provided for adjusting the optical path length for producing the interference by reference light and detecting light without fail. Furthermore, in the disc, the depth of the pit is set for producing the interference by both light beams. Thus, the interference is exactly produced, thereby stably reading out the information.

In the embodiment, the disc having two recording surfaces is described. The disc having three or more recording surfaces may be available. In this case, the medium of the adjacent layers are formed to have a different refractive index.

On the recording surfaces 26 and 27, a dielectric film may be provided to control the reflectance and the double refraction. Furthermore, a function for varying the transmittance and the polarization characteristic may be provided on the recording surfaces other than the pits.

In place of the SLD as the light source 29, it is possible to use other element which emits light having a temporal incoherent characteristic such as a multi-mode diode, light emitting diode, or surface emitting LED.

In place of the plane reference mirror 34, a mirror having a vertical angle of 90 degrees is used. Therefore, the influence caused by inclination of the mirror during the moving operation is reduced.

The moving device 33 for moving the reference mirror 34 is formed by piezoelectric transducer. As another method, a liquid crystal element having a variable refractive index can be provided in one of the optical paths for controlling the optical path length. The refractive index of liquid crystal is changed by voltage.

In the embodiment, the optical path difference is fixed. Alternatively, the difference may be controlled by finely changing the optical path length to obtain the maximum signal at all times, or it may be controlled based on measured amount such as change of servo signal or the quantity of light caused by change of the optical path length.

In the embodiment, the image of pit is focused on the photodetector 38 and detected by the photodetector. As another method, a spot is formed on the recording surface 26 or 27, reflected light of the spot and reflected light from the reflecting film 28 are interfered with each other and the interference is detected at a position away from the focal point.

In the embodiment, although the recombined light beams are focused on the recording surfaces of the disc, the detecting light reflected from the fixed mirror 32 can be reflected from the reflecting film 28. For the purpose, a weak lens may be disposed between the beam splitter 31 and the fixed mirror 32, or the fixed mirror 32 is formed to have a curvature. Thus, it is possible to increase the strength of signal.

The reflectance of each mirror is arbitrarily determined. For example, each mirrors has the reflectance of 100% or each mirror has the reflectance such that the intensities of two luminous fluxes are equal to each other on the photodetector 38. These are of design matters.

Figure 5:
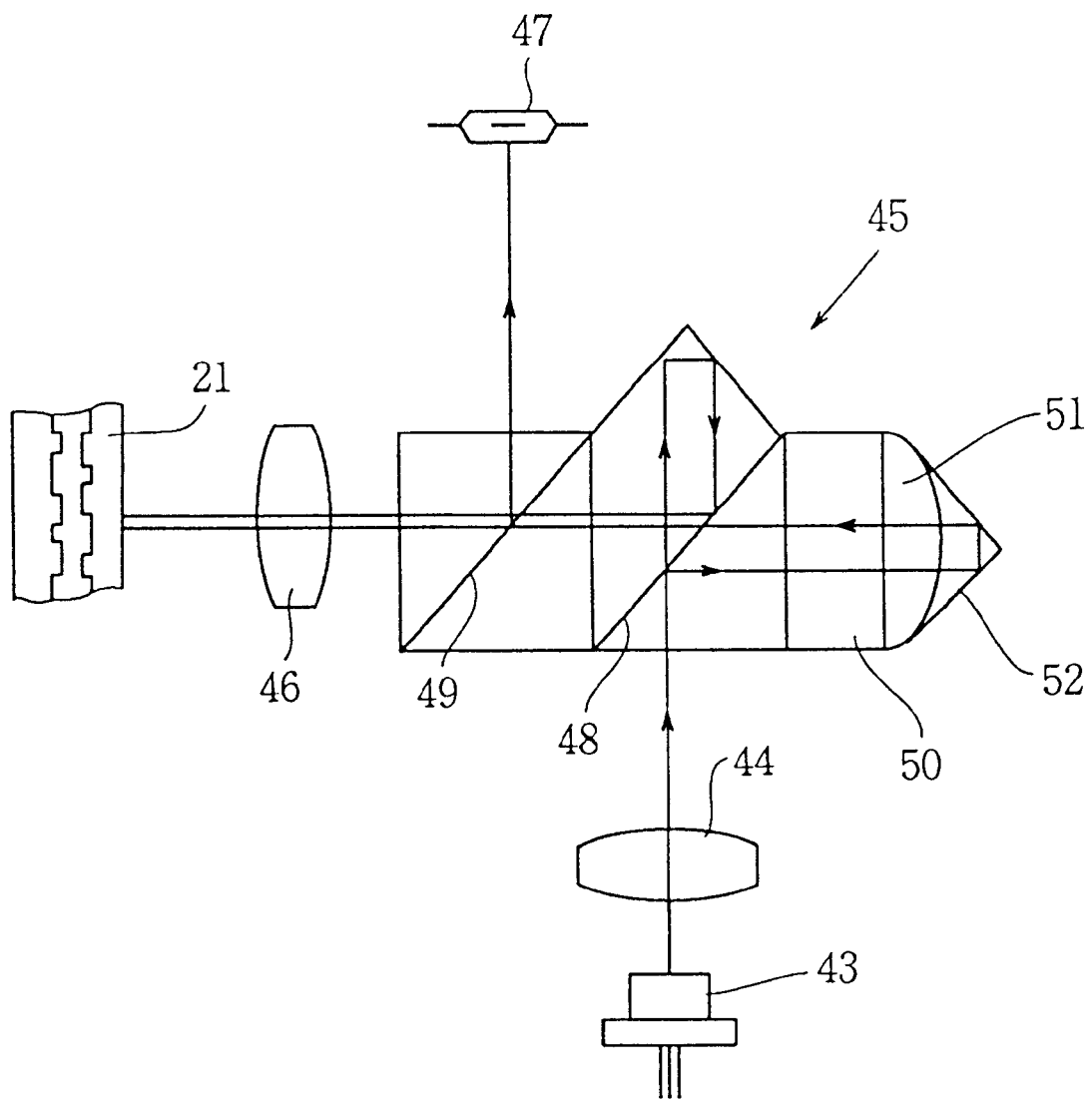
FIG. 5 is a diagram showing a second embodiment of the reading system of the present invention.

FIG. 5 shows a second embodiment of the reading system of the present invention. The reading system comprises a multi-mode semiconductor laser 43 as a light source, a relay lens 44, a compound optical prism 45, an objective 46 and a photodetector 47. The compound prism 45 has a beam splitter film 48, a reflecting prism 49, a liquid crystal element 50, a lens 51 and a reflecting prism 52. The liquid crystal element 50 has a variable refractive index to be varied in accordance with a voltage externally applied thereto.

A laser beam emitted from the multi-mode semiconductor laser 43 is diverged at the relay lens 44 and applied to the compound prism 45. The laser beam is divided into transmitting light and reflecting light at the beam splitter film 48. The transmitting light is reflected from the reflecting prism 49 and the beam splitter 48 and applied to the objective 46. The light is focused on the reflecting film 28 of the disc 21 as reference light.

On the other hand, the reflecting light divided at the beam splitter film 48 is applied to the liquid crystal element 50. The optical path length of the reflecting light is changed by changing the refractive index of the liquid crystal element in accordance with the voltage applied thereto so that the reflecting light interferes with the transmitting light. The light is further controlled at the lens 51 to be focused on the selected recording surface 26 or 27 as detecting light. The detecting light is reflected from the reflecting prism 52 and focused on the selected recording surface of the disc 21 at the objective 46. The elements 49, 51 and 52 compose a light projecting means.

The reference light reflected from the reflecting film 28 and the detecting light reflected from the selected recording surface are condensed by the objective 46 and reflected from the reflecting prism 49. The reflected light beams are interfered with each other and applied to the photodetector 47. Thus, a contrast signal is obtained in dependency on the phase difference between the pits of the respective recording surfaces 26 and 27.

Other basic structure and operation are the same as those of the first embodiment.

The aforementioned structure of the read-only optical disc 21 of the present invention is employed for a writable optical disc.

Figure 6:
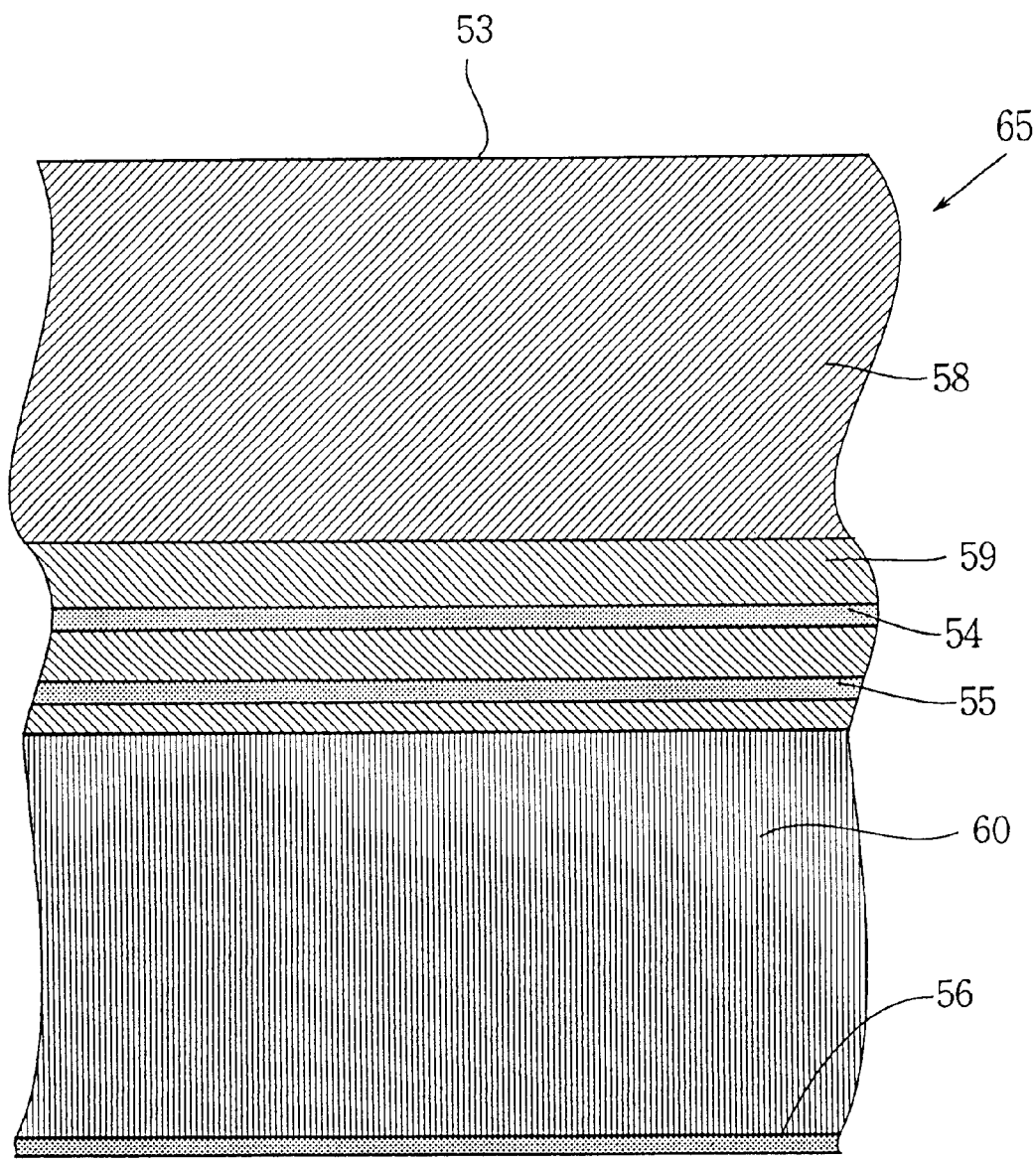
FIG. 6 is a schematic sectional view showing a writable optical disc of the present invention.

Referring to FIG. 6 showing a writable optical disc, a writable optical disc 65 comprises a first substrate 60 made of polycarbonate, a recording layer 59 provided on the first substrate, and a second substrate 58 made of polycarbonate and provided on the recording layer 59 and having a surface 53. A reflecting film 56 made of aluminum is coated on the first substrate 60. The recording layer 59 is made of lithium niobate crystal or photo-refractive crystal and has two writing areas 54 and 55 on which information is to be written. The writing areas 54 and 55 can be arbitrarily positioned in the recording layer 59 in accordance with a focal point of a writing system.

In order to write the information on the disc, the optical characteristic of the recording layer is changed in accordance with the condensed light. Thus, various kinds of materials are used as the recording layer employed with a recording method such as coloring, phase difference of reflectance between amorphous and crystal, or magneto-optical effect applied with external magnetic field.

In place of the writing areas 54 and 55 formed in the recording layer 59, multi-layered thin films are provided as writing areas.

Figure 7:
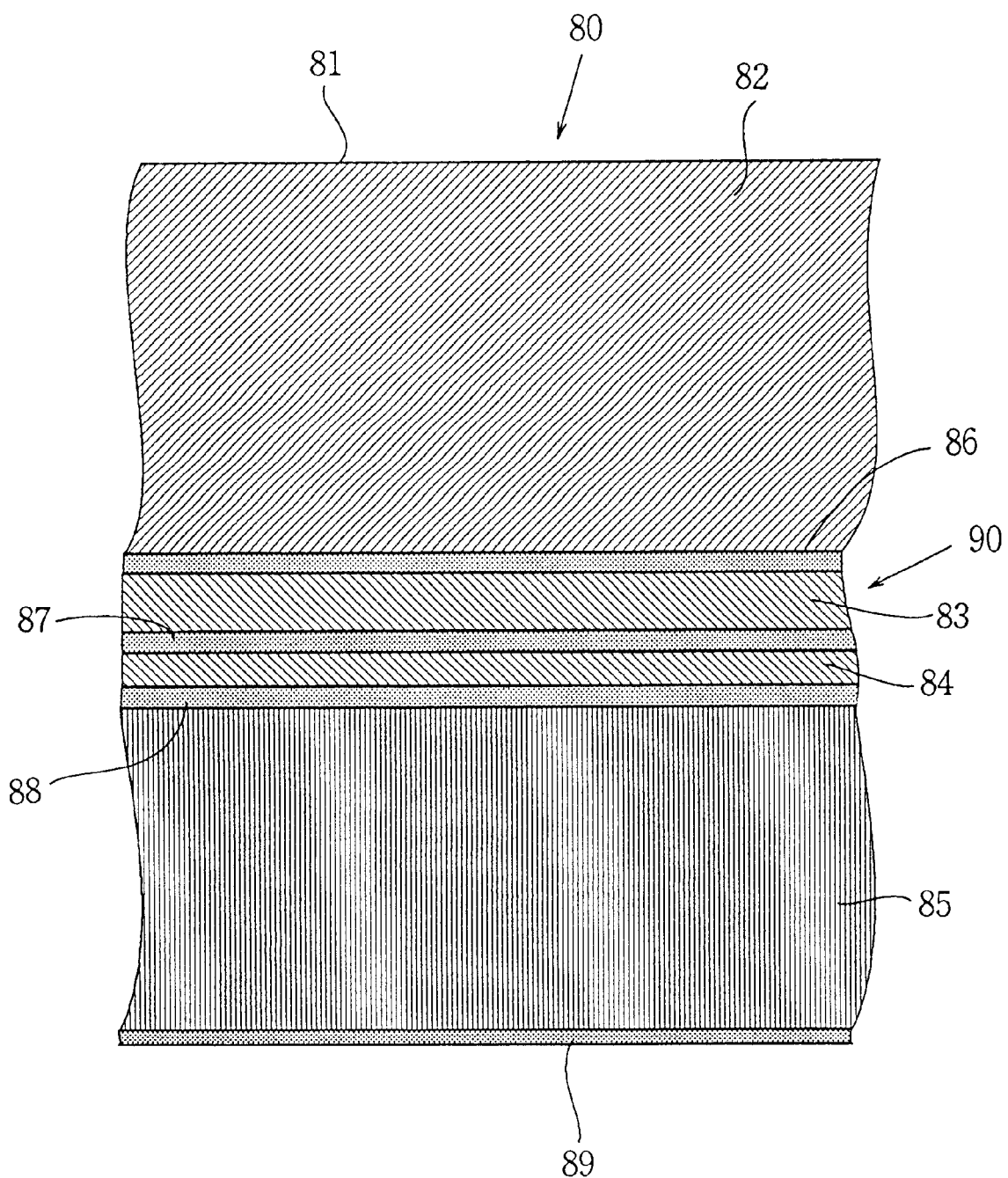
FIG. 7 is a schematic sectional view showing another embodiment of the writable disc of the present invention.

FIG. 7 shows another embodiment of the writable optical disc having writing areas formed by multi-layered thin films. An optical writable disc 80 comprises a transparent first substrate 85 made of polycarbonate and having a predetermined thickness, a reflecting film 89 made of aluminum and coated on the first substrate 85, a recording layer 90 provided on the first substrate 85, and a second substrate 82 made of polycarbonate and provided on the recording layer 90 and having a surface 81. The recording layer 90 has writing thin films 86, 87 and 88 as writing areas, and thin films 83 and 84 interposed between the writing films. The writing film 86 is made of germanium antimony tellurium and provided on the second substrate 82, and the writing films 87 and 88 are made of ultraviolet curing resin. Films 83 and 84 are made of ultraviolet curing transparent resin.

In the embodiment, it is possible to layer the writing films in order without transparent films 83 and 84.

In order to write information on the writable disc 65 or 80, a writing system employed with the principle of the OCDR is used. Briefly describing, the writing system comprises a light projecting means for projecting the light on the writable disc, and a focus control means for detecting the light reflected from the disc and controlling a focal point of the light projected on the disc. The focal point is controlled to focus the projected light on a desired writing area based on the luminous intensity of the reflected light from the reflecting film in the disc.

Figure 8:
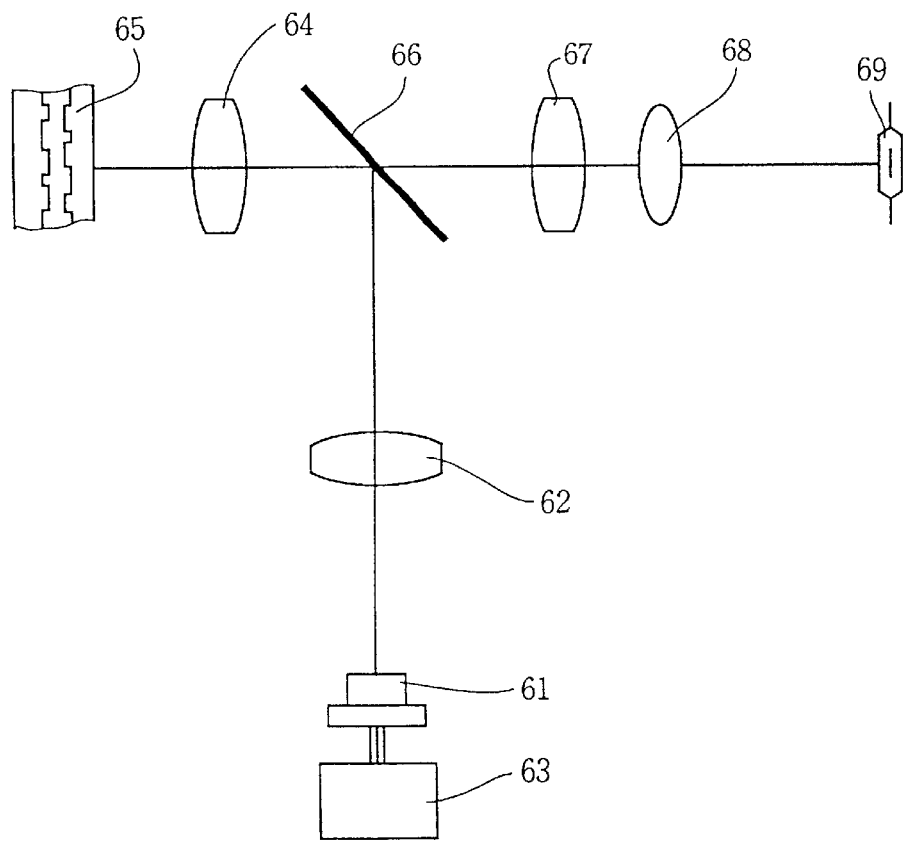
FIG. 8 is a diagram showing a writing system of the present invention.

FIG. 8 shows a writing system employed with the principle of the OCDR. The writing system comprises a semiconductor laser 61 as a light source for emitting a laser beam, a current modulator 63 connected to the semiconductor laser 61, a collimator lens 62 at which the laser beam is paralleled, a half mirror 66, an objective 64, an imagery lens 67, a cylindrical lens 68 and a photodetector 69.

The semiconductor laser 61 has a function to change the refractive index of the writing area when the light is focused thereon. The current modulator 63 is provided for modulating a current for driving the laser 61 in dependency on a writing signal. The photodetector 69 is positioned between two focal lines by the lenses 67 and 68.

A laser beam emitted from the semiconductor laser 61 is paralleled at the collimator lens 62. The parallel light is reflected from the half mirror 66 and applied to the objective 64. The light is focused on the writing area of the disc 65 by the objective. However, since the focal point is formed on the writing area which is not a reflecting portion, the focused light is further spread and strikes the reflecting film 56. The light reflected from the reflecting film 56 is condensed by the objective. The condensed light is applied to the photodetector 69 passing through the lenses 67 and 68 to be focused thereon with astigmatism.

Figure 9:
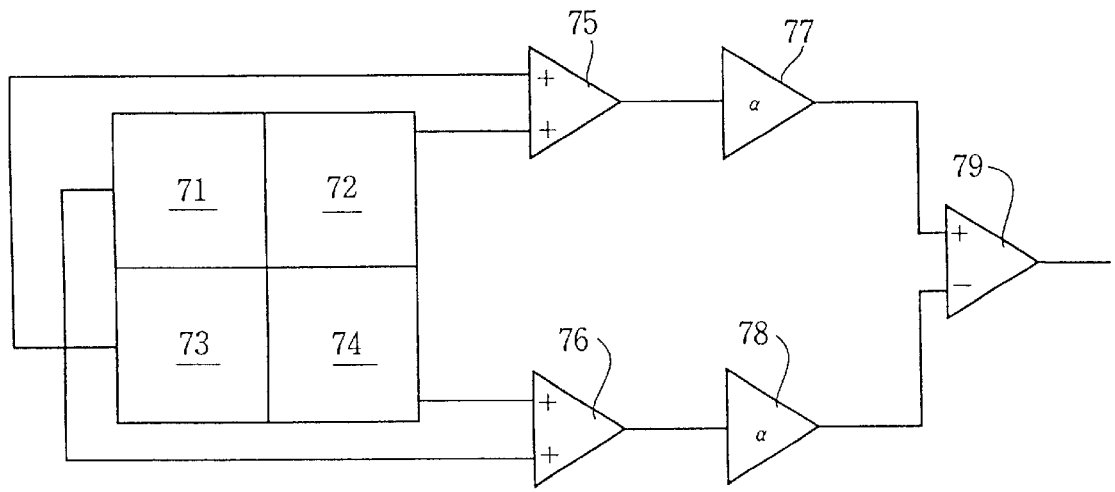
FIG. 9 is a diagram showing a photodetector of the writing system.

Referring to FIG. 9, the photodetector 69 comprises four-divided photodetecting elements 71, 72, 73 and 74, adders 75, 76, amplifier 77, 78 and a subtractor 79. An output of each of the photodetecting elements 72 and 73 which are in a diagonal relation is applied to the adder 75. An output of each of the photodetecting elements 71 and 74 which are in a diagonal relation is applied to the adder 76. The outputs are added in the respective adders. The output added at the adder 75 is applied to the amplifier 77, and the output added at the adder 76 is applied to the amplifier 78. The outputs are amplified at the respective amplifiers 77 and 78. The amplified outputs are applied to the subtractor 79 where a difference is obtained.

If the photodetector 69 is disposed in the intermediate of the two focal lines, the spot of light becomes circular on the photodetector. It means that the difference is zero. Thus, it is possible to focus the light on a desired position of the disc 65 by the light reflected from the reflecting film at a predetermined distance.

On the other hand, in order to focus the light on another position, amplifying ratios of the amplifiers 77 and 78 are changed and the spot of light becomes an ellipse on the photodetector 69.

Such a focus control operation may be employed for the reading system of the present invention.

From the foregoing, in the writable disc, it is not necessary to provide a reflecting film. As a result, in writing operation, since the loss of quantity of light becomes small, the information can be written on the desired position even if the disc is multi-layered. Thus, it is effective to provide a high recording density of the writable disc and access the information at high speed.

The information written on the writable disc is read out by the reading system shown in FIG. 2 or FIG. 5. The writing system is added to the reading system, thereby forming a reading and writing system. If any of circuits in both systems have the same function, circuits are commonly used, thereby miniaturizing the system.

In accordance with the present invention, when the information of the optical disc is read out by the reading system, loss of the quantity of light is regulated. Therefore, if the disc is multi-layered, the information can be sensitively read out. As a result, the recording capacity of the disc is increased, and the information can be accessed at a high speed.

Since it is not necessary to position the disc with accuracy, the manufacturing process is simplified and manufacturing cost is prevented from increasing.

While the invention has been described in conjunction with preferred specific embodiment thereof, it will be understood that this description is intended to illustrate and not limit the scope of the invention, which is defined by the following claims.

What is claimed is:

1. An optical medium comprising:
   a transparent first substrate;
   a transparent recording layer formed over the first substrate having first and second recording surfaces on sides thereof, the first and second recording surfaces each including grooves and lands that define recorded information;
   wherein the recording layer only has a single refractive index;
   a transparent second substrate formed over the recording layer; and
   only a single flat reflecting film formed on an outside surface of the first substrate.

2. The optical medium according to claim 1, wherein the first and second substrates adjacent the recording layer have different refractive indexes than the recording layer.

3. The optical medium according to claim 1, wherein a depth of the grooves is set so that a phase difference between a phase of an incident light entering the second substrate and a phase of a light reflected from one of the first and second recording surfaces becomes $\pi$.

4. The optical medium according to claim 1, wherein the first and second substrates are formed of polycarbonate.

5. The optical medium according to claim 1, wherein the first and second substrates are formed on the same material.

6. The optical medium according to claim 1, wherein the recording layer is formed of ultraviolet curing resin.

7. The optical medium according to claim 1, wherein the recording layer includes one of air and an inert gas between the first and second substrates.

8. The optical medium according to claim 1, wherein the first and second substrates are formed of polycarbonate,
   wherein a first dielectric layer is between the recording layer and the first substrate,
   wherein a second dielectric layer is between the recording layer and the second substrate,
   wherein the recording layer is formed of ultraviolet curing resin, and
   wherein the first and second substrates have different refractive indexes from each other.

9. The optical medium according to claim 1, wherein the reflective film is an outside surface of the optical recording medium.

10. An optical medium comprising:
    a transparent first substrate having a first refractive index;
    a recording layer formed over the first substrate and having a first recording area at an interface between the first substrate and the recording layer;
    wherein the recording layer only has a single refractive index that is different than the first refractive index;
    a transparent second substrate formed over the recording layer and having a second recording area at an interface between the second substrate and the recording layer;
    wherein the second substrate has a second refractive index different than the single refractive index of the recording layer; and
    only a single flat reflecting film formed on an outside surface of the first substrate.

11. The optical medium according to claim 10, wherein the first and second substrates are formed of polycarbonate.

12. The optical medium according to claim 10, wherein the first and second substrates are formed of the same material.

13. The optical medium according to claim 10, wherein the reflective film is an outside surface of the optical recording medium.

14. The optical medium according to claim 10, wherein the recording layer is formed of ultraviolet curing resin.

15. The optical medium according to claim 10, wherein the recording layer includes one of air and an inert gas between the first and second substrates.

16. The optical medium according to claim 10, further including a first dielectric layer between the recording layer and the first substrate, and a dielectric layer between the recording layer and the second substrate.

17. The optical medium according to claim 10, wherein the first and second substrates are formed of polycarbonate,
    wherein a first dielectric layer is between the recording layer and the first substrate,
    wherein a second dielectric layer is between the recording layer and the second substrate,
    wherein the recording layer is formed of ultraviolet curing resin, and
    wherein the first and second substrates have different refractive indexes from each other.

18. The optical medium according to claim 10, wherein the first and second recording surfaces each include grooves and lands for recording information, and
    wherein the grooves have a depth such that a phase difference between a phase of an incident light entering the second substrate and a phase of a light reflected from one of the first and second recording surface is $\pi$.

19. An optical medium comprising:
    a transparent first substrate;
    only a single flat reflecting film on a first side of the first substrate;
    a recording layer formed directly on a second side of the first substrate and having a first recording surface at a boundary between the first substrate and the recording layer; and
    a transparent second substrate formed directly on the recording layer and having a second recording surface at a boundary between the recording layer and the second substrate; and
    wherein the reflective film reflects input light through an interface between the recording layer and a substrate so as to interfere with output light reflected from the interface to increase contrast of the output light when the recorded optical data is read.

20. The optical medium according to claim 19, wherein the first and second substrates are formed of polycarbonate.

21. The optical medium according to claim 19, wherein the reflective film is an outside surface of the optical recording medium.

22. The optical medium according to claim 19, wherein recording layer is formed of ultraviolet curing resin.

23. The optical medium according to claim 19, wherein the recording layer includes one of air and an inert gas between the first and second substrates.

24. The optical medium according to claim 19, wherein the first and second substrates have different refractive indexes from each other.

25. The optical medium according to claim 19, further including a first dielectric layer between the recording layer and the first substrate, and the second dielectric layer between the recording layer and the second substrate.

26. An optical recording medium comprising:
    a flat reflective film;
    a transparent first layer positioned over the reflective layer having only a first refractive index, wherein the first layer has at least one surface with grooves and lands;
    a transparent second layer positioned over the reflective layer having only a second refractive index that is different from the first refractive index, wherein the second layer has at least one surface with grooves and lands;
    a first set of recorded surfaces having various lengths between lands in a layer and a second set of recorded surfaces having various lengths between grooves in another layer, wherein a combination of the first set of recorded surfaces and the second set of recorded surfaces represent optical data within the optical recording medium; and
    wherein the reflective film reflects light through an interface between two recorded surfaces of different layers so as to interfere with light reflected from the interface so as to increase contrast of output light when the optical data is read.

27. The optical recording medium according to claim 26, wherein the lands of the first layer are interdigitated with the lands of the second layer.

28. The optical recording medium according to claim 27, wherein a dielectric layer is positioned between the first and second layers.

29. The optical recording medium according to claim 26, wherein a third layer having only a third refractive index is positioned between the first and second layer;
  a first surface of the third layer having lands interdigitated with the lands of the first layer; and
  a second surface of the third layer having lands interdigitated with the lands of the second layer.

30. The optical recording medium according to claim 29, wherein a first dielectric layer is positioned between the first and third layers; and
  a second dielectric layer is positioned between the second and third layers.

* * * * *